Jan. 17, 1950 L. SCHWITZER ET AL 2,494,725
POWER-DRIVEN VEHICLE WITH LOADING RAMP
Original Filed Dec. 11, 1943 2 Sheets-Sheet 1
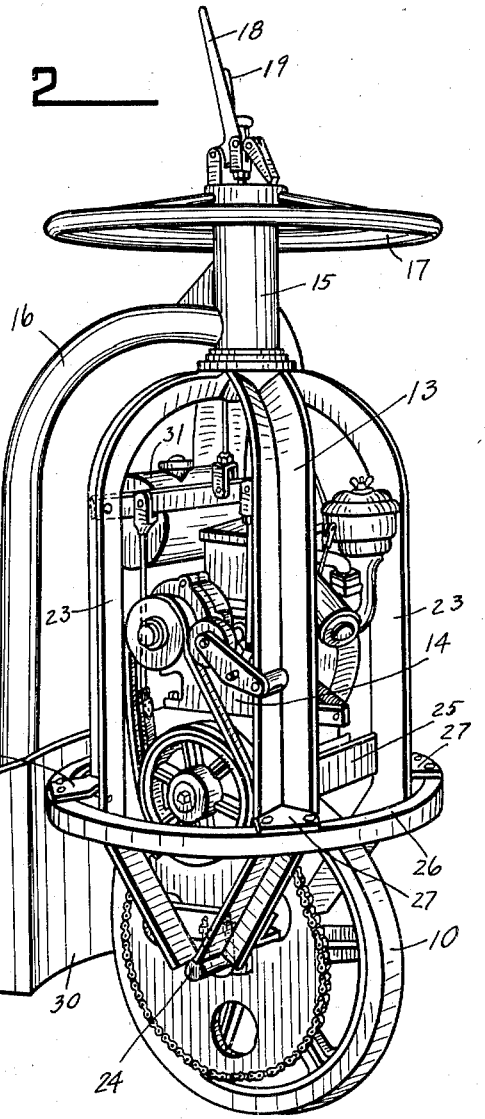
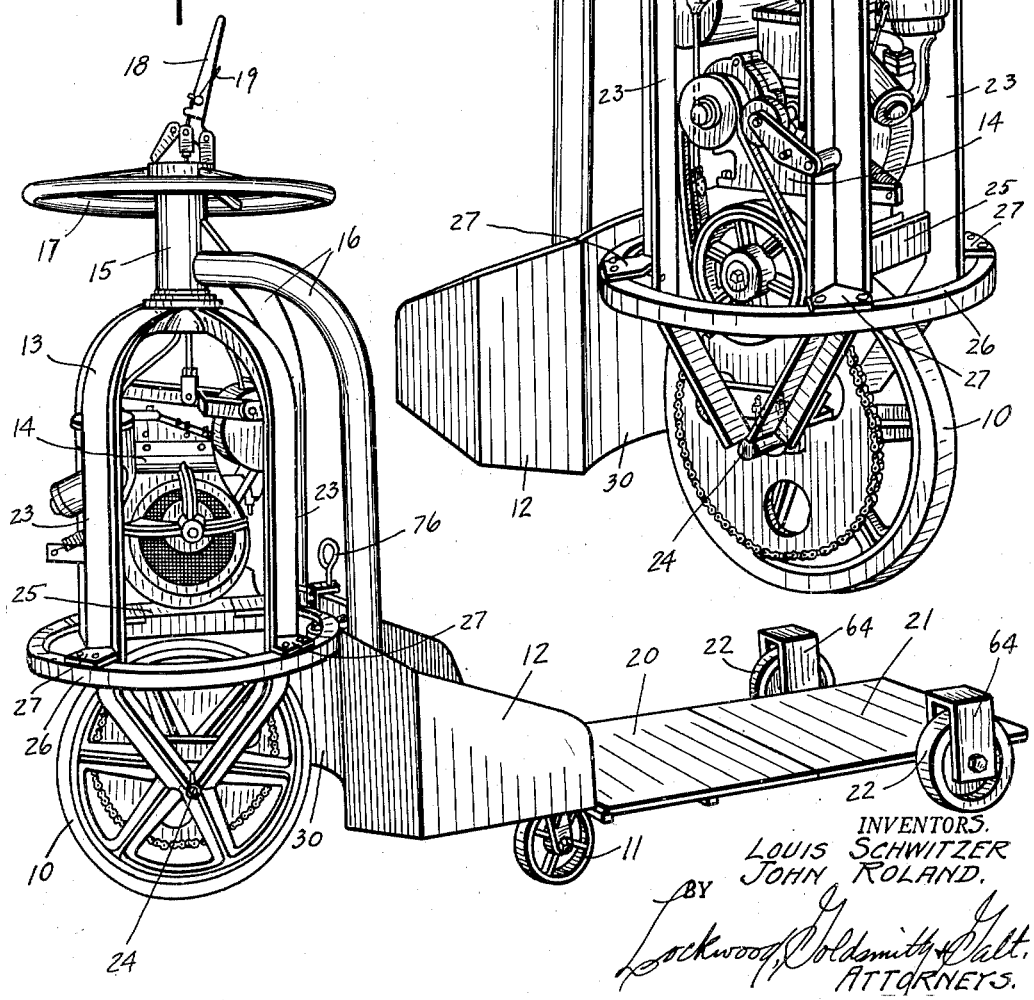
INVENTORS.
LOUIS SCHWITZER
JOHN ROLAND.
BY
Lockwood, Goldsmith & Galt.
ATTORNEYS.

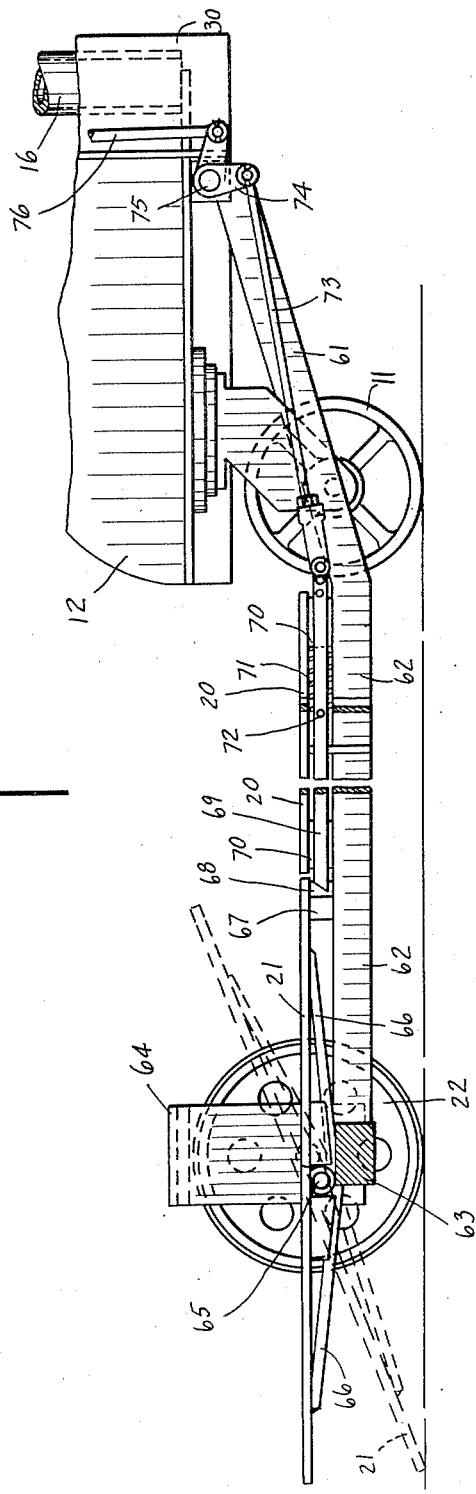

Patented Jan. 17, 1950

2,494,725

UNITED STATES PATENT OFFICE 2,494,725

POWER-DRIVEN VEHICLE WITH LOADING RAMP

Louis Schwitzer and John Roland, Indianapolis, Ind., assignors to Schwitzer-Cummins Company, Indianapolis, Ind., a corporation Original application December 11, 1943, Serial No. 513,858. Divided and this application April 14, 1948, Serial No. 21,006

3 Claims. (Cl. 214—85)

This invention relates to a power driven vehicle such as an industrial truck for shop use in handling and transporting materials, packages, baggage, or the like particularly in confined quarters, but which can be used to advantage wherever material is to be transported, reference being had to our copending application, Serial Number 513,858, filed December 11, 1943, now Patent No. 2,443,480 granted June 15, 1948, for "Power driven vehicle," of which this application is a division.

It is the object of this invention to provide the vehicle with a truck bed or trailer arranged with a load carrying platform having a tilting section mounted at the rear end thereof which is controllable by the driver from a point adjacent the power unit. More particularly the loading platform of the vehicle has a forward fixed section and a rearwardly disposed tilting section pivotally mounted intermediate its ends over the rear supporting axle, the chassis frame of the platform being underslung to permit the rear edge of the tilting section to move from its normal supporting position to the floor in a manner to provide a loading and unloading ramp.

Another feature of the invention resides in the latching mechanism for the tilting section for normally holding said section in horizontal alignment with the fixed section of the platform, said latching mechanism having a control extending forwardly to a conveniently operable position adjacent the operator's platform. Said control mechanism is arranged to normally latch the tilting section in horizontal position while being movable by the operator at his station on the power unit to release said section and permit it to tilt into inclined load receiving or unloading position.

The full nature of the invention will be understood from the accompanying drawings and the following description and claims:

Fig. 1 is a view showing a side elevation of the vehicle in perspective.

Fig. 2 is a perspective view of the power unit.

Fig. 3 is a side elevation of the truck platform showing a section thereof in loading position by dotted lines.

The industrial truck shown in the drawings includes a driving unit comprising a single front driving or traction wheel 10 and a pair of swivel caster wheels 11, a driver's platform having side shields 12 and a power unit frame 13 mounted upon the driving wheel to embrace the driving motor 14. Said frame is mounted to swivel within the upper vertical frame bearing 15 through which it supports the forward platform frame members 16. For steering and reversing the driving unit, a steering wheel 17 is mounted above the bearing 15 in convenient position for an operator standing upon the driving platform. Directly above the steering wheel in convenient position for the operator there is provided an upstanding belt drive and brake control lever in the form of a handle 18 with which the throttle lever 19 is associated. Extending rearwardly from the driving platform and removably connected thereto so as to be supported thereon at its forward end, there is a load carrying trailer 20 having a fulcrumed ramp section 21, said trailer being underslung on the follower wheels 22.

The supporting and protective frame for the motor comprises four equally spaced outwardly bulging angle bars 23 having their upper ends inwardly turned and secured to a spindle extending through the top bearing 15 carrying the forward frame members 16 of the driving platform. At their lower ends, said angle bars are bent inwardly on opposite sides of the driving wheel 10 to form a bearing support for the axle 24 thereof. Said angle bars are so arranged and spaced as to completely embrace the motor 14 and offer protection therefor as well as a support while permitting ready access to the operating mechanism. The motor is supported upon a platform 25 secured to said angle bars immediately above the driving wheel, and around said bars slightly below the motor supporting platform there is a protecting and stabilizing ring 26. Said ring is mounted to extend outwardly from said bars and be secured thereto by the flange plates 27.

The forward end of the trailer platform 20 is supported by the driving platform at a lower underslung level, by an upwardly sloping tongue 61 hitched to the under structure thereof, said tongue extending from a low level chassis frame 62 which is connected at its rear end to a cross member 63. Said cross member carries on each end thereof an upwardly extending bracket 64 for receiving one of the trailer wheels 22 in which said wheel has its axle bearing. The rear loading section 21 is directly supported upon a swivel mounting 65 intermediate its ends, being reenforced by the struts 66. The forward end of this section is provided with a downwardly extending cross piece 67 normally resting upon the chassis frame 62. Thus, section 21 may swivel about its mounting 65 so that the rear end may be tilted downwardly to the floor, while in normal load carrying position it is in horizontal alignment with the forward load carrying platform section 20.

The forward end of section 21 centrally and forwardly of the cross beam 67 has a latch head 68 engageable by the latch bar 69 extending longitudinally under the platform section 20 and slidable in suitable bearings 70 secured to the underside thereof. A spring 71 surrounding the latch rod is positioned between one of the bearings 70 and the cross pin 72 so as to normally maintain said rod in latching position. The forward end of said latch rod is adjustably connected with the connecting rod 73 extending under the driver's platform for pivotal connection to the crank arm 74 fulcrumed upon a stud 75 supported thereunder. The free end of the crank arm is pivotally connected to the operating rod 76 which extends upwardly through the driver's platform and is provided with a handle at the upper end thereof for convenient manipulation.

By means of this arrangement the operator by pulling upwardly on the handle 76 may unlatch the rear loading section 21 permitting it to tilt downwardly to the floor as shown in dotted lines in Fig. 6 for convenient loading or unloading of heavy material. Thereafter said platform 21 is swung to its horizontal position wherein it is latched by action of the spring 71.

From the foregoing description it may be noted that the operation of the truck permits of convenient loading of material onto the platforms 20 and 21 through the manipulation of the section 21.

While the invention has been particularly described as applied to an industrial truck, it is evident that it is also applicable to any power driven vehicle irrespective of its purpose or use.

The invention claimed is:

1. A truck having a chassis, supporting wheels therefor, a fixed platform section carried at one end of said chassis, a tiltable loading platform section carried at the other end of said chassis, said sections normally lying in the same plane to provide a trucking platform, a latch mounted on the underside of said tilting section, and a latching member extending under said fixed section and projecting upwardly therefrom normally in latching engagement to maintain said tiltable section in load carrying position and manually releasable to disengage said section to permit it to tilt to loading and unloading position.

2. A truck having a chassis, a driving and steering unit therefor mounted forwardly thereof, said unit including a motor driven traction wheel, an operator's platform and a pair of swivel casters, a trailer having a platform carrying frame connected at one end to said chassis and supported at the other end by a pair of rear supporting wheels, a fixed platform section mounted on the forward end of said frame, a tiltable platform section pivotally mounted on the rear end thereof, means for releasably supporting the forward end of said frame on said unit, a latch for normally latching said tiltable section in horizontal load carrying position, and means extending above said operator's platform operable to release said latch for permitting said tiltable section to tilt downwardly into loading and unloading position.

3. A truck having a chassis, a driving and steering unit therefor mounted forwardly thereof, said unit including a motor driven traction wheel, an operator's platform and a pair of swivel casters, a trailer having a platform carrying frame extending in a plane below said operator's platform and provided with an upwardly and forwardly extending tongue connected to the underside of said platform forwardly of said casters, a pair of rear supporting wheels for said frame, means for supporting the rear end of said frame below the axis of said supporting wheels, a fixed platform section mounted forwardly of said frame, a tiltable platform section pivotally mounted at the rear of said frame, said tiltable section being normally supported adjacent the fixed section and in alignment therewith and being tiltable to extend downwardly and rearwardly therefrom, a latch extending under the forward section into latching engagement with the forward edge of the tiltable section for normally retaining said tilting section in horizontal load carrying position, a bell crank lever pivotally mounted on said operator's platform having one arm thereof connected to said latch bar, an operating rod connected with the other arm of said bell crank lever extending upwardly therefrom adjacent the driving and steering unit, and a biasing spring mounted on said latch operable to normally maintain it in latching position while permitting it to be disengaged from said tiltable section for releasing it to tilt downwardly into loading and unloading position.

LOUIS SCHWITZER.
JOHN ROLAND.

REFERENCES CITED

The following references are of record in the file of this patent:

UNITED STATES PATENTS

| Number | Name | Date |
|---|---|---|
| 1,352,898 | Houck | Sept. 14, 1920 |
| 1,870,573 | Kuchar | Aug. 9, 1932 |
| 1,924,797 | Mitchell | Aug. 29, 1933 |
| 1,926,238 | Kuester | Sept. 12, 1933 |
| 2,370,866 | Lewis | Mar. 6, 1945 |

FOREIGN PATENTS

| Number | Country | Date |
|---|---|---|
| 304,002 | Great Britain | Jan. 17, 1929 |
| 477,423 | Great Britain | Dec. 30, 1937 |
| 362,598 | Italy | Aug. 30, 1938 |